Figure 1:
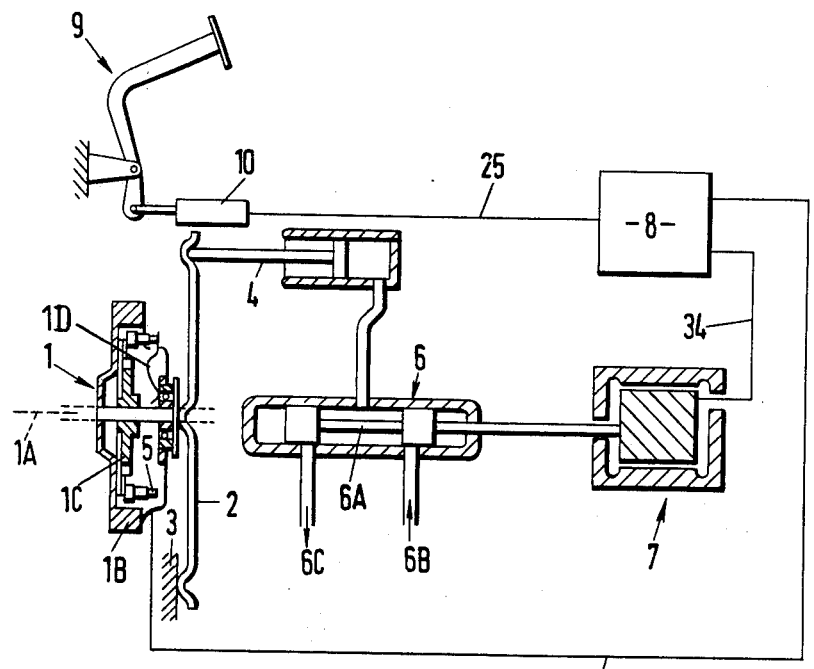

United States Patent [19]

Dickinson

[11] 4,023,660
[45] May 17, 1977

[54] FOLLOW-UP SERVO SYSTEMS FOR CLUTCHES

[75] Inventor: Harvey Frank Dickinson, Bramhall, England

[73] Assignee: Ferranti, Limited, Hollinwood, England

[22] Filed: Oct. 23, 1975

[21] Appl. No.: 625,087

Related U.S. Application Data

[63] Continuation-in-part of Ser. No. 509,260, Sept. 25, 1974, abandoned.

[30] Foreign Application Priority Data

Sept. 29, 1973 United Kingdom ............. 45646/73

[52] U.S. Cl. ................................ 192/.075; 192/52; 192/111 A; 235/92 CC
[51] Int. Cl.² .................. B60K 29/02; F16D 13/75
[58] Field of Search ............. 192/.07, .075, 111 A, 192/52

[56] References Cited

UNITED STATES PATENTS

| | | | |
|---|---|---|---|
| 2,180,537 | 11/1939 | McCollum et al. | 192/.075 |
| 2,880,831 | 4/1959 | Maurice et al. | 192/.07 |
| 3,132,728 | 5/1964 | Chaptios | 192/.075 |
| 3,823,621 | 7/1974 | Kubo | 192/52 |

FOREIGN PATENTS OR APPLICATIONS 1,079,451   5/1954   France ................. 192/.07

Primary Examiner—Benjamin W. Wyche
Attorney, Agent, or Firm—Cameron, Kerkam, Sutton, Stowell & Stowell

[57] ABSTRACT

In a follow-up servo system for the electrical control of a friction clutch of, say, a motor vehicle from the throttle control by way of an electro-mechanical actuator, with automatic take-up of the wear of the mating friction surfaces, whenever the clutch plate (i.e. the axially-movable part) is in its fully-engaged (FE) position with respect to the cooperating axially-fixed part a signal is repetitively derived to represent the corresponding just-touching (JT) position of the plate under the then conditions of wear. To this signal is added a signal from the throttle control within a range corresponding to the JT-FE range of the plate, thereby forming a demand signal corrected for wear. From a comparison of it with a measurement signal representing the actual position of the plate an error signal is derived for application to the actuator in the appropriate sense.

9 Claims, 9 Drawing Figures

FOLLOW-UP SERVO SYSTEMS FOR CLUTCHES

This application is a continuation-in-part of copending application Ser. No. 509,260, filed Sept. 25th, 1974, and now abandoned.

This invention relates to follow-up servo systems for controlling by means of an actuator system, and in response to signals from a demand member, the location of an axially-displaceable part of a mechanical friction clutch with respect to the co-operating axially-fixed part of the clutch. By "axially" is meant along the rotational axis of the clutch.

The clutch may form part of the mechanical transmission system of any type of apparatus, but in this specification, for convenience, will be described as forming part of a motor vehicle. Such apparatus has a demand member comprising a throttle control, and in the apparatus to which the present invention relates the setting of this demand member is required to control the axial location of the displaceable part of the clutch.

An electrical signal representing the actual axial location of the displaceable part of the clutch is provided by a device such as a mechanical-electrical transducer, and for convenience will be referred to as the measurement transducer.

Such a transducer is also used to provide an electrical signal representing the setting of the demand member, for example, the extent of the throttle opening, and for convenience will be referred to as the demand transducer.

The actuator system, controlled by electrical signals from the demand member, for example, includes a hydraulic actuator the parts of which are controlled by the signals.

It is necessary to provide a follow-up servo system for controlling the actuator system in response to signals from the demand member, to cause the required movement of the displaceable part of the clutch when this part is not in its position as demanded by the setting of the demand member. For the follow-up servo system to operate it is necessary to compare a signal representing the axial separation between the displaceable part of the clutch and the fixed part with a signal indicating the setting of the demand member. It is required for example, that when the throttle control comprising the demand member is open by 15 percent the displaceable part of the clutch is in its just-touching (JT) position with the fixed part, and when the throttle is fully open the displaceable part of the clutch is in its fully-engaged (FE) position with the fixed part. Beyond the JT position the displaceable part has a fully-disengaged (FD) position.

Because of wear of both mating surfaces of the clutch the JT, FE and FD positions of the displaceable part vary in relation to a reference point. It is an object of the present invention to provide a novel and advantageous follow-up servo system for controlling the axial location of the displaceable part, which system compensates for the wear of of the mating surfaces of the clutch by causing the JT, FE and FD positions of the displaceable part to vary accordingly, In accordance with the present invention a follow-up servo system for controlling by means of an actuator system, and in response to signals from a demand member, the location of an axially-displaceable part of a mechanical friction clutch with respect to the co-operating axially-fixed part of the clutch, includes measurement transducer means for deriving a signal to represent the actual instantaneous axial location of the displaceable part in relation to a reference point, means for supplying a signal to represent the axial location of the displaceable part in relation to the reference point when the displaceable part in its instantaneous just touching (JT) position with the fixed part, by combing in the appropriate manner a signal from the measurement transducer means when the displaceable part is in its fully-engaged (FE) position with the fixed part, and a constant signal provided by means with the system and representing the distance between JT and FE positions of the displaceable part, demand transducer means for deriving from the demand member an electrical signal representing the instantaneous setting of the demand member, this signal also representing the desired instantaneous axial separation between the displaceable and fixed clutch parts as demanded by the demand member, summation means responsive to and combining both the signal representing the JT position of the displaceable clutch part and the signal representing the desired instantaneous axial separation between the displaceable and fixed clutch parts, and so deriving the required instantaneous axial location of the displaceable part in relation to the reference point, comparator means for comparing the signals representing the required and the actual instantaneous axial location of the displaceable part in relation to the reference point and, in response to the detection of any difference therebetween other than a predetermined value, to provide an error signal indicative of the difference, and connections for applying the error signal to the actuator system to bring about a movement of the displaceable part in the direction for nulling the error signal.

Whatever the state of wear between the mating surfaces of the clutch parts the distance between the JT and FE positions of the displaceable part of the clutch is a constant. Thus, it is possible to derive and to store within the follow up servo system a constant signal representing this axial separation, provided that the measurement transducer has a linear response over the normally encountered range of movement of the axially-displaceable part, taking into account the maximum permitted state of wear between the mating surfaces of the clutch parts.

The arrangement is such that the signal representing the instantaneous JT position of the displaceable part of the clutch is derived repetitively and as referred to above, and automatically during the operation of the mechanical transmission system, when the displaceable part is in its FE position. The signal representing each instantaneous JT position, when derived, is stored. Hence, compensation is obtained for the state of wear between the mating surfaces of the clutch parts when the signal representing such an instantaneous JT position so derived is employed in the manner referred to above, to determine the required instantaneous axial location of the displaceable clutch part in relation to the reference point, and to be compared with the actual instantaneous axial separation between the displaceable clutch part and the reference point.

To allow the signals from the measurement transducer associated with the displaceable part and the signals representing the settings of the demand member to be combined in the required manner, the arrangement should be such that, when the wear of the mating surfaces is compensated sufficiently, the sum of the signal representing the JT position and the demand member setting signal provides the signal desired to represent the required instantaneous location of the displaceable part of the clutch in relation to the reference point. One way of achieving this would be to design the measurement and demand transducers to correspond with one another when the displaceable part of the clutch is between its JT and FE positions, and the demand member is set intermediate between the settings requiring the displaceable part to be between these positions. This, however, may not always be convenient, for example, it may be required that the movement of the demand member is several times greater than the corresponding movement required of the displaceable part of the clutch. Further, if the transducers provide signals in analog form, but the follow-up servo system is required to provide error signals in digital form, it is necessary that the analog signals from the transducers are supplied first to analog-to-digital converter (ADC) stages. In this case it is convenient to arrange that the manners of operation of the combination of the ADC stages and transducers correspond to each other in the way referred to above, and such that the sum of the JT and demand member setting signals provides the signal desired to represent the required instantaneous location of the displaceable part of the clutch in relation to the reference point, and this summation signal may be compared directly with the signal from the measurement transducer.

Figure 2A:
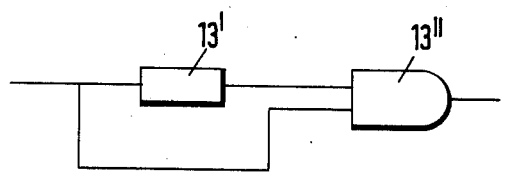
Figure 2B:
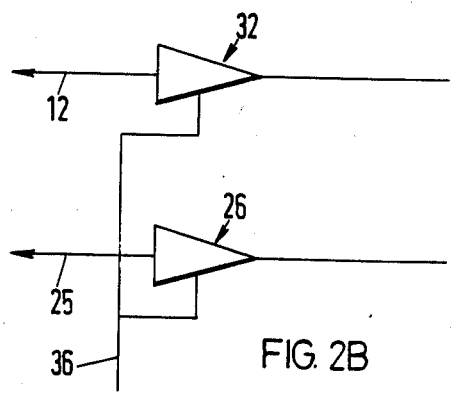
Figure 2:
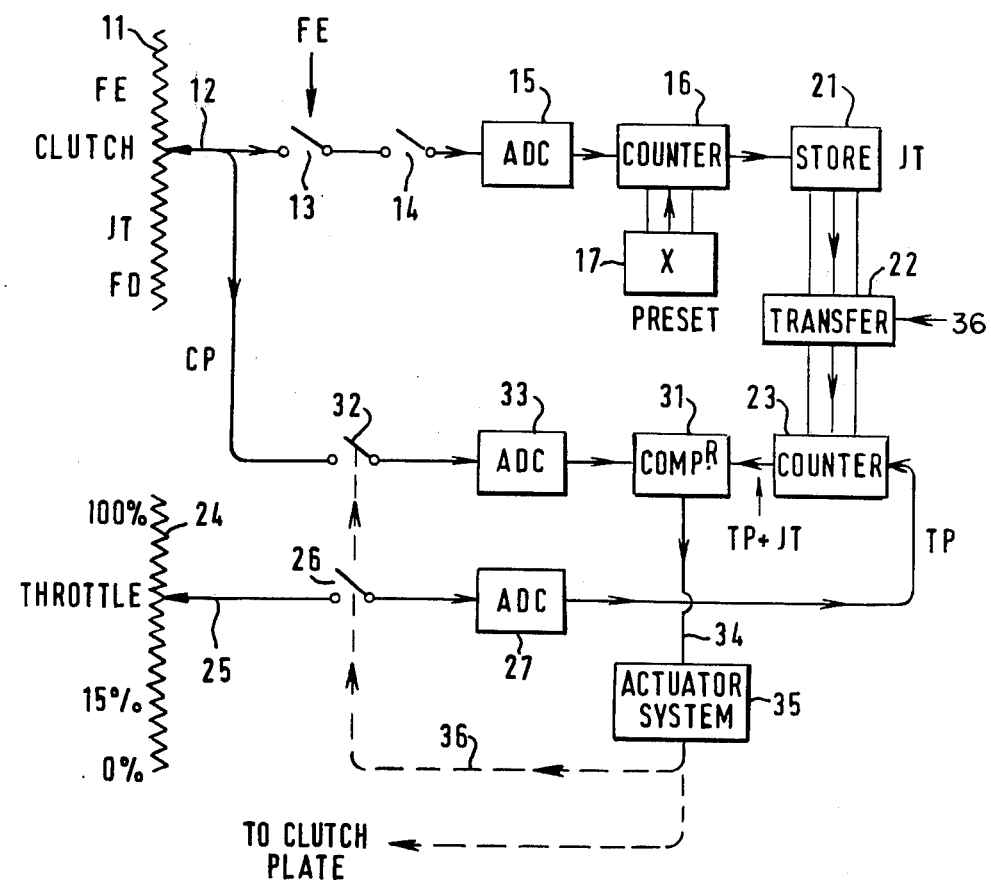
Figure 3:
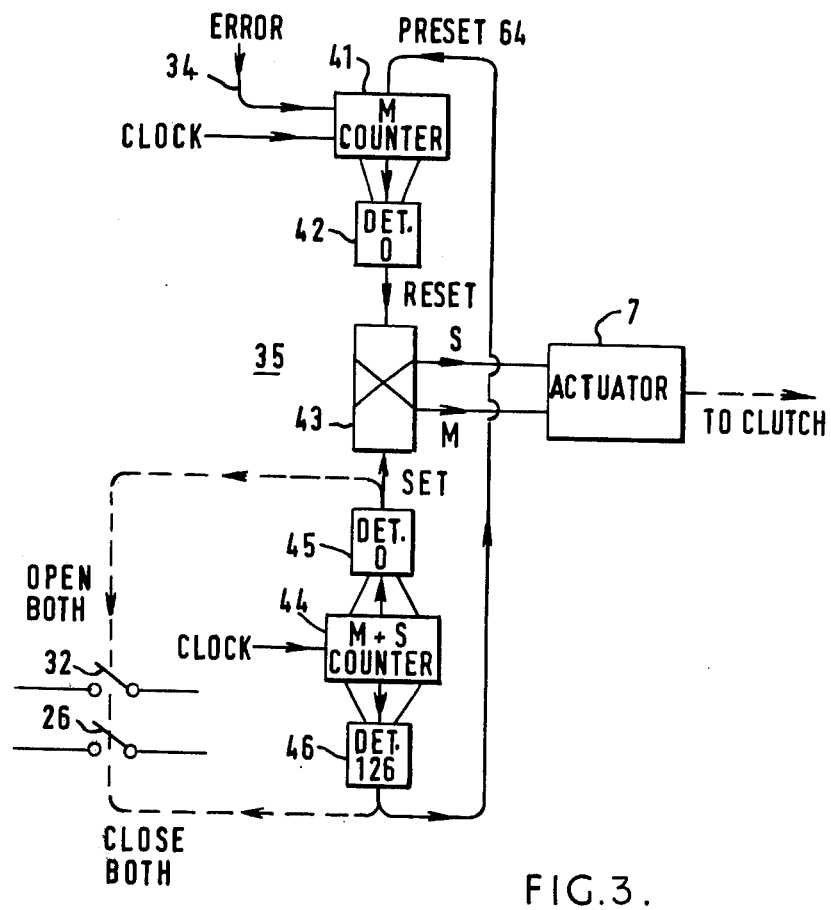
Figure 4:
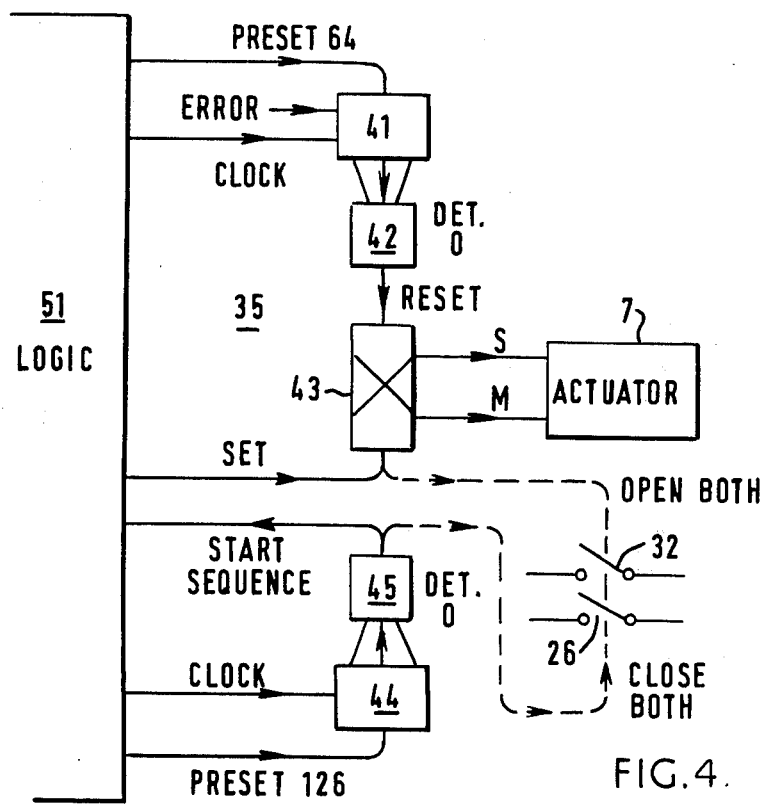
Figure 6:
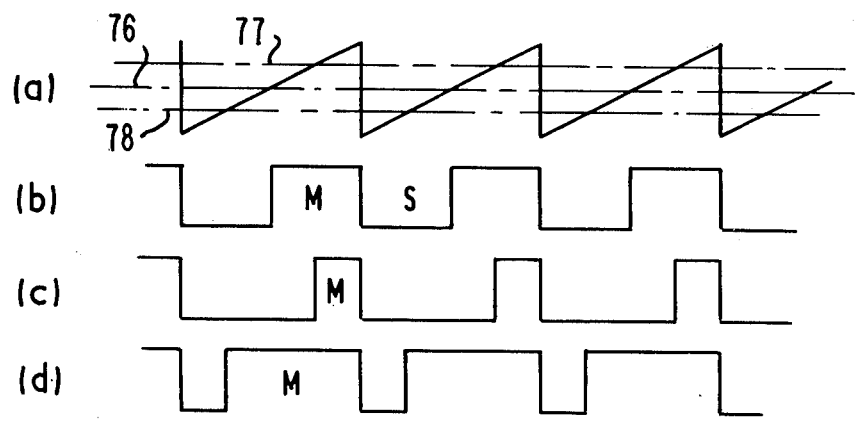
Figure 5:
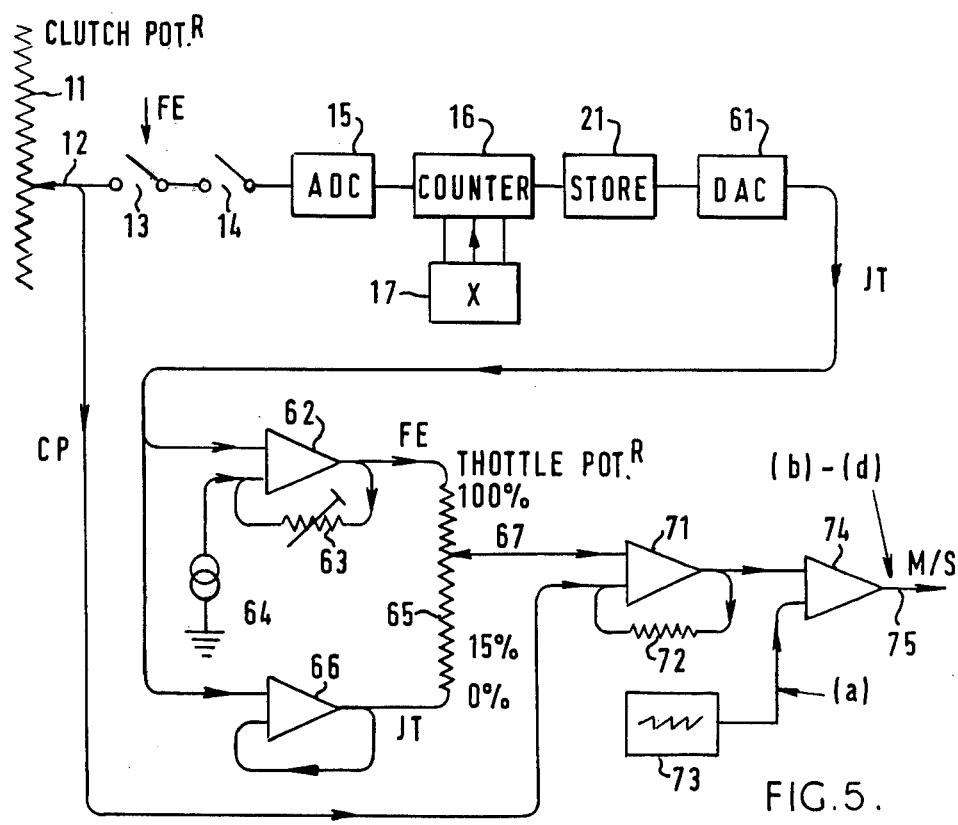
Figure 7:
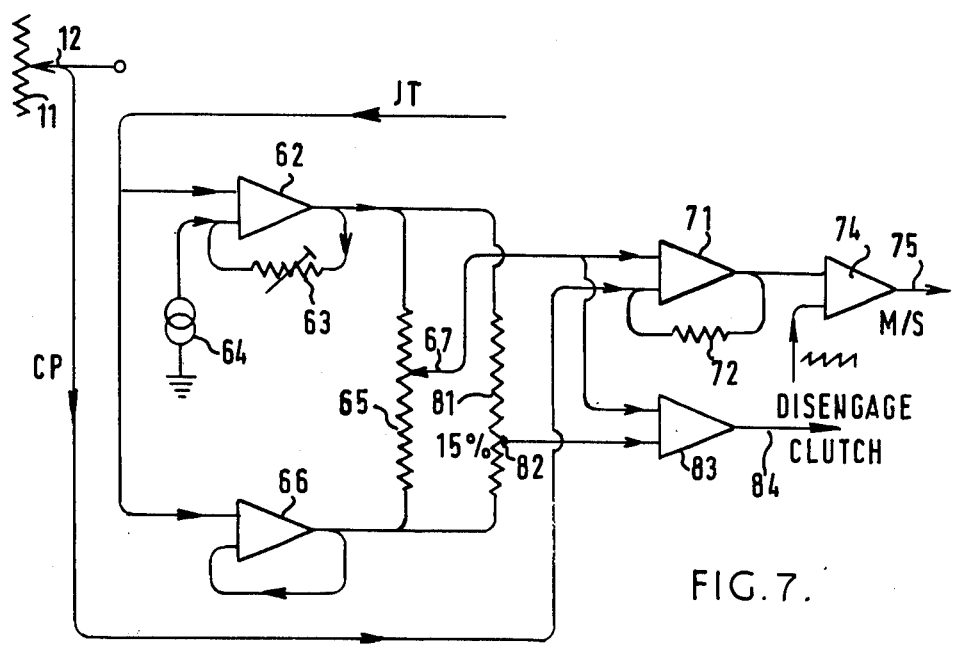

The present invention will now be described by way of example with reference to the accompanying drawings, in which FIG. 1 shows a mechanical transmission system of a vehicle, the mechanical transmission system having a throttle control, a mechanical friction clutch, a clutch actuator system, and electronic control means for the clutch actuator, the arrangement according to the present invention comprising the follow-up servo system for the clutch and including the clutch actuator system and the clutch actuator control means, the control means being arranged to operate in response to signals from the throttle control, FIG. 2 is a simplified schematic diagram of one embodiment of the clutch actuator control means, FIG. 2A is a logic diagram of a part of FIG. 2, FIG. 2B is of another part of FIG. 2, FIG. 3 shows yet another part of the diagram of FIG. 2 in more detail, FIG. 4 shows a modified form of the circuit of FIG. 3, FIG. 5 shows a modified form of the arrangement of FIG. 2, FIG. 6 is a wave diagram to illustrate the operation of a part of the arrangement of FIG. 5, and FIG. 7 shows another modified version of the arrangement of FIG. 2.

The vehicle mechanical transmission system shown in FIG. 1 has a friction clutch 1 with a conventional construction having mounted on a rotational axis 1A an axially fixed member 1B and an axially displaceable member 1C. The axially displaceable member 1C is moved under the control of a lever 2 pivotally mounted on the clutch 1 at a point intermediate between the two ends of the lever. One end of the lever 2 abuts against an anchorage 3, whilst the other end of the lever is pivotally connected to the piston 4 of a slave cylinder of the hydraulic system controlling the clutch. The position of the axially displaceable member 1C on the axis 1A is measured by a measurement transducer 5.

The interior of the slave cylinder is connected to the central chamber of a spool valve 6. The double-headed piston 6A of the spool valve controls the input and output passages of the hydraulic system, respectively 6B and 6C. If the double-headed piston 6A is moved to the right as shown in FIG. 1 the slave cylinder is connected to a source of high-pressure fluid (not shown). In response, the piston 4 of the slave cylinder is moved to the left, and the clutch becomes disengaged. If the double-headed piston 6A is moved to the left as shown in FIG. 1 the slave cylinder is connected to the low-pressure reservoir (not shown) of the hydraulic system. In response, the piston 4 of the slave cylinder is moved to the right, and the clutch becomes engaged. In the absence of fluid pressure on the piston 4 of the slave cylinder, the piston 4 is moved to the right, and the clutch becomes engaged, under the action of a diaphragm spring 1D of the clutch.

The double-headed piston 6A is connected to the coil of a moving coil actuator 7 for displacement therewith. The winding of the moving coil actuator is energized by signals derived from electronic control means indicated generally at 8 in FIG. 1. The signals are supplied to the coil actuator 7 on a lead 34.

The vehicle also has a demand member comprising a throttle control 9 of a conventional construction, having a pedal arrangement, and to control the throttle opening of the engine of the vehicle. A demand transducer 10 measures the throttle opening as determined by the position of the throttle control 9.

Signals are supplied from the measurement transducer 5 to the control means 8 on a lead 12, and signals are supplied from the demand transducer 10 to the control means 8 on a lead 25.

It will be noted that the no clutch pedal is provided. The clutch is required to be controlled in response to the throttle opening as measured by the demand transducer 10, and hence the throttle control 9 comprises the demand member for the clutch operation.

For mechanical reasons it is necessary for the actuator 7 to cause the displaceable clutch plate 1C to vibrate towards and away from the co-operating fixed part 1B of the clutch at a frequency of about 200 Hz and over a very small range of movement. This vibration is to be continuous, as soon as the clutch becomes responsive to the throttle control 9. Thus, the signal necessary from the control means 8 to control the clutch actuator 7 needs to have a Mark/Space rectangular waveform at this frequency of the vibration and to have an appropriate small amplitude. Throughout each Mark half-cycle the actuator 7 moves the displaceable clutch plate 1C towards the co-operating fixed part 1B of the clutch, and away from it throughout each Space half-cycle.

The invention is not directly concerned with the type of clutch actuator system 2 to 7 employed but with the control means 8 from which is derived the signals to operate the actuator system.

Arrangements with which the invention also is not concerned detect when both parts of the clutch are running at the same speed and, in response, cause the vibrations to cease, the control means 8 to become inoperable, and the clutch to be fully engaged. This action would occur whatever the position of the displaceable clutch plate — even if it were fully disengaged — and would override any different position of the displaceable clutch plate that the throttle control 9 might be demanding at the moment. The vibrations will not be resumed and the control means 8 will be inoperable, until the road speed and/or engine speed drop below a predetermined minimum value.

When the displaceable part 1C of the clutch is in the position demanded by the throttle control 9, and irrespective of the magnitude of the throttle opening, the Mark and Space half-cycles of the signals supplied by the control means 8 to the coil actuator 7 are of equal length, and the piston 6A of the spool valve is vibrated symmetrically about the mid-point between the input and output passages 6B and 6C of the spool valve. To change the position of the displaceable part 1C of the clutch, in response to a change in the throttle control 9, the Mark and Space half-cycles of the signals supplied by the control means 8 to the coil actuator 7 are made unequal. Hence, the piston 6A of the spool valve, whilst vibrating, is laterally displaced in the appropriate direction in relation to the mid-point between the input and output passages 6B and 6C of the spool valve. The piston 4 of the slave cylinder moves in the appropriate direction, with a constant force, until the displaceable part 1C of the clutch is in the position demanded by the throttle control 9. Then, the Mark and Space half-cycles of the signals supplied by the control means 8 to the coil actuator 7 again become of equal length, and the coil actuator 7 vibrates symmetrically with the piston 4 in its new position. It would be noted that the signals supplied by the control means 8 to the coil actuator 7 do not represent the position of the displaceable part 1C, of the clutch demanded by the throttle control but cause the clutch actuator system to move in the appropriate direction, when required. The movement of the clutch actuator system, other than the symmetrical vibration, is stopped when the displaceable part 1C of the clutch is in the position demanded by the throttle control.

When the Mark half-cycles are greater than the Space half-cycles the double-headed piston 6A of the spool valve moves to the right as shown in FIG. 2, and the displaceable clutch plate 1C is moved towards the fixed clutch part 1B. When the Space half-cycles are smaller than the Mark half-cycles the double-headed piston 6A of the spool valve moves to the left as shown in FIG. 1, and the displaceable clutch plate 1C is moved away from the fixed clutch part 1B.

The present invention relates to the follow-up servo system which controls the clutch 1 by means of the clutch actuator system 2 to 7, and in response to signals from the control means 8. The follow-up servo system includes a clutch actuator system of the conventional construction referred to above, and the control means 8.

One embodiment of the novel control means 8 in accordance with the present invention is shown in FIG. 2. In this Figure the known clutch actuator system is indicated at 35, and is to receive the Mark and Space signals from the control means 8 on the lead 34. The control means receives signals from the measurement and demand transducers 5 and 10 on leads 12 and 25, respectively.

In the operation of the clutch the displaceable part 1C has a just-touching (JT) position with the fixed part 1B, a fully-engaged (FE) position, and a fully-disengaged (FED) position. The arrangement is such that the throttle is open by 15 percent for the displaceable part of the clutch to be in its JT position, and the throttle is fully open for the displaceable part to be in its FE position.

Because of wear of both mating surfaces of the clutch both the JT and FE positions of the displaceable part 1C vary in relation to the fixed reference point.

The axial location of the displaceable part 1C of the clutch, in relation to a reference point (not shown) on the rotational axis 1A of the clutch is determined by the measurement transducer 5. In the illustrated arrangement the measurement transducer 5 is of the potentiometer kind and comprises a resistive winding 11. The winding is energized by a D.C. source (not shown) in a sense so that the reference point of the clutch corresponds to a point (not shown) on a hypothetical projection of the winding beyond its lower end as depicted in FIG. 2.

There is usually no particularly critical location for the hypothetical axial point to which the measurement, FE, and JT signals are referred. It has been assumed above that it was on the gearbox side of the clutch, with the result that the JT position is arrived at by subtracting a JT/FE signal representing the fixed distance apart of the JT and FE positions, from the FE signal. This reference point might on the other hand be located on the engine side of the clutch, as long as account was taken of the change of sign — for example, so that to derive the JT signal, the JT/FE signal and FE signal are combined by addition. In either case the JT signal is derived from the FE signal in dependence on a signal representing the constant difference between them.

The winding is traversed by a wiper 12 mounted so as to move with the displaceable part of the clutch, and the winding is long enough to be engaged by the wiper when corresponding both to the FD and FE positions of the displaceable part, under the maximum conditions of wear for the clutch. These FD and FE positions together with JT position are indicated in the drawing but it will be understood from what has been said above that their locations on the winding are not fixed but shift along it as the clutch surfaces wear. Wherever they are on the winding, the FE and JT positions are at a constant distance apart. The winding is uniformly wound, so that the voltage between those points is also a constant. This voltage is referred to in this specification as the JT/FE signal X.

Wiper 12 is connected by way of two switches 13 and 14 in series to an analog-to-digital converter (ADC) 15 designed to converter the analog signal derived by wiper 12 into digital form as a train of pulses. This pulse train is applied as an input to a binary counter 16. The binary counter 16 also has an input comprising a signal from a store 17 in which the JT/FE signal X has been preset in binary form. By substracting that signal X from the signal supplied by ADC 15 when the diplaceable part of the clutch is in its FE position, counter 16 computes a signal to represent the JT position of the clutch plate with respect to the reference point under the existing conditions of wear and deliveries it to a store 21 where it is retained in binary digital form.

When the displaceable clutch plate is in its FE position, or FD position, the displaceable clutch plate stops vibrating, and conventional means (not shown) causes the application of Mark and Space signals to the coil actuation 7 to cease. If the displaceable clutch plate is in its FE position a continuous Mark signal is obtained, and if the displaceable clutch plate is in its FD position a continuous Space signal is obtained, from the control means 8. This action controls the switch 13, and conveniently the switch 13 has the form shown in FIG. 2A. The Mark-and-Space signals from the control means 8 are supplied to a monostable device 13' and to an AND logic gate 13''. The monostable device 13' is arranged so that it provides an output signal to the AND gate 13'' when it has stopped oscillating by receiving Mark-and-Space signals for a period of 200 milliseconds. Under these conditions it is ensured that the displaceable clutch plate is in its FE position, and both inputs of the AND gate 13'' receive signals. In response the AND gate 13'' provides a signal to close the switch 13, comprising an FET device.

The demand transducer is also of the potentiometer kind consisting of an energized winding 24 fixed to the vehicle and trasversed by a wiper 25 mounted so as to move with the throttle control 9 (FIG. 1).

Wiper 25 is connected by way of a switch 26 to an ADC stage 27 so as to apply the throttle position (TP) signal represented by the size of the throttle opening to counter 23.

The demand transducer is only effective over the range 15 to 100 percent of the range from JT to FE of the displaceable clutch plate. Between 0 and 15 percent the wiper 25 is energized, but ADC 27 is designed to supply a nil output until the 15 percent position of the wiper has been reached.

Counter 23 is designed to add the signal TP from the demand transducer to the JT signal transferred from store 21, thereby providing a signal to represent the displaceable clutch plate position demanded by the throttle as one input to a comparator 31.

To the other input in applied a measurement signal (CP) representing the actual position of the displaceable clutch plate with respect to the reference point and as detected by the measurement transducer. This signal CP is derived from wiper 12 by way of a switch 32 and an anlog-to-digital converter 33.

The arrangement may be such that, for any throttle opening, the output signals of the measurement and demand transducers are similar to the JT signal from the counter 21. The voltage between the 15 and 100 percent points of winding 24 should be the same as that between the JT and FE points on winding 11. Where this arrangement is not practicable, the transducers, or their windings, or the manner of their energization, may be as is conveniently provided, and the necessary corrections made at least at one of ADCs 15, 27 and 33 so that at least the digital representations of the simultaneous corresponding signals supplied to the counter 23 and the comparator 31 have the necessary degree of similarity.

Switch 14 represents part of a conventional timing system (not shown). When the switch 13 is closed, switch 14 is operated repeatedly and rapidly under the control of some master clock, and each time switch 14 is closed, the analog signal on wiper 12 is converted to digital form by ADC 15 and applied to the store 21 after the JT/FE signal X preset in stage 17 has been substracted from it in counter 16. By this means the location of the just-touching position of the displaceable clutch plate, as retained by store 21, is kept closely up to date with the condition of wear of the clutch surfaces, the determination of the instantaneous JT position being obtained each time the displaceable clutch plate is in its FE position.

The signal X is derived empirically when setting up the apparatus, and there is provided in the control means conventional means 17 including a counter having preset inputs. Each time an enable signal is provided for the counter the number X is entered into the corner and is available to be supplied to the counter 16.

Switches 26 and 32 each comprise a known form of gated operational amplifier as shown in FIG. 2B, both operated under the control of signals supplied on a lead 36, and in the manner described below with reference to FIG. 3.

The comparator 31 is arranged to subtract the measurement signal CP provided at one input of the comparator 31 from the sum of the TP and JT signals provided at the other input by counter 23, and to supply over the lead 34 to the clutch actuator system, indicated at 35 in FIG. 2, an error signal of appropriate sense and magnitude whenever those two inputs of the comparator are unequal. The error signal also represents, in any convenient manner, the sense of that difference. It will be assumed that the sense is positive where the demand is for a movement of the displaceable clutch plate towards the co-operating fixed part of the clutch.

The lead 34 carrying the error signal is connected to the clutch actuator system 35 by a Mark/Space generator circuit, not indicated in FIG. 2, but illustrated in FIG. 3. The generation of the Mark/Space signal is under the control of a clock, which keeps the frequency constant. All that the error signal supplied on lead 34 does is to disturb the symmetry of the Mark and Space half-cycles output of the generator, to effect a change in the clutch operation as described above in relation to FIG. 1. The error signal is applied as one input to a reversible Mark counter 41 of seven bit capacity. The other input of the Mark counter 41 is supplied by a clock pulse train at a repetition frequency of about 25 KHz in a sense to count down the contents of the counter 41, and after the error signal pulses have been added to, or substract from, according to their sense, the number 64 preset in the counter.

Associated with counter 41 is a "detect zero" stage 42 designed so that when the counter's contents have been counted down to zero, the stage supplies to a bistable stage 43 a signal to switch it to what will be referred to as its Reset state.

The clock pulses are also supplied, this time additively, and alone, to a seven bit Mark-pulse-Space counter 44 having a detect-zero stage 45 to switch bistable 43 to its SET state when the counter 44 has passed in one step from its complement of 128 pulses to zero.

The output of the bistable stage 43 provides the required Mark-and-Space signals to be provided to the coil actuator 7 (FIG. 1). The Mark half-cycles M are provided when the bistable stage 43 is in its Set state, and the Space half-cycles S are provided when the bistable stage 43 is in its Reset state. The Mark-pulse-Space counter 44 determines the frequency of the Mark-and-Space signals, and as the counter 44 reaches zero at a repetition frequency of 200 Hz this is the constant repetition frequency of the Mark-and-Space signals, as are required to be supplied to the coil actuator 7.

Also associated with Mark-pulse-Space counter 44 is a stage 46 arranged so that when the counter 44 has received its 126th pulse, the stage 46 supplies an output signal to close switches 26 and 32 to allow an up-to-date error signal to be derived as described with reference to FIG. 2, and to open transfer stage 22 to pass a JT signal to counter 23. The output of stage 46 also serves to cause the number 64 to be preset in the Mark counter 41, erasing any other number that might be present at that moment.

In addition to setting bistable 43, the output signal from stage 45 when it detects zero in the Mark-pulse-Space counter 44 is applied to re-open switches 26 and 32, and to close transfer stage 22.

The operation of the circuit of FIG. 3 will now be described, starting at the moment when the Mark-pulse-Space counter 44 has received its 126th clock pulse from passing zero. The bistable 43 is in its Reset state, determined by the output of the Mark counter 41, and the signal supplied to the actuator 7 is near the end of a space half-cycle.

Initially, the condition when the displaceable clutch plate 1C is in the position demanded by the throttle opening, and the error signal supplied by the circuit of FIG. 2 on the lead 34 is zero, will be considered.

In response to the 126th clock pulse, stage 46 presets th number 64 in the Mark counter 41, and at the same time closes switches 26 and 32 (FIG. 2), and opens transfer stage 22.

As the error signal is zero — meaning that the two pulse inputs to comparator 31 are alike — the closing of those switches 26 and 32 produces no effect. Accordingly the Mark counter 41 remains holding the number 64.

Three clock pulses later, the Mark-pulse-Space counter 46 steps from 128 to 0. In response, stage 45 re-opens switches 26 and 32, closes transfer stage 22, and triggers bistable 43 to its Set state to conclude the Space half-cycle and to being the next Mark half-cycle of the signal supplied to the actuator 7.

The clock pulses now step the Mark counter 41 down from 64 and the Mark-pulse-Space counter 44 up from 0. Throughout these 64 pulses, bistable 43 remains in its Set state defining a Mark half-cycle of the signal supplied to the actuator 7.

At the 64th clock pulse, the Mark counter 41 reaches zero and stage 42 switches bistable 43, and the signal supplied to the actuator 7 changes from Mark to Space.

The next 64 clock pulses carry on with the count in the Mark-plus-Space counter 44. They are also applied to the Mark counter 41; their effect on it can be ignored; for it cannot disturb bistable 43 and whatever the total accumulated in the Mark counter 41 is at the 126th clock pulse, the entry of the 64 number into the counter 41 which occurs at that time erases whatever number counter 41 may then hold.

At the second occurrence of the 126th clock pulse, stage 46 closes switches 26 and 32, opens transfer stage 22, and the sequence as above described is repeated, at a repetition rate of 200 Hz.

As both the Mark and Space half-cycles are each defined by 64 clock pulses, the waveform of the signal supplied to the actuator 7 is symmetrical, and the response of the actuator 7 itself is to vibrate the displaceable clutch plate about the position which agrees with the existing demand of the throttle opening.

Suppose, now, that the throttle setting is changed and it is required to change the position of the displaceable clutch plate, in a sense so that the displaceable clutch plate moves towards its FE position. The movement of the wiper 25 (FIG. 2) disturbs the balance at comparator 31 and causes an error signal of, say, 16 pulses of positive sense to be developed during the brief period when switches 26 and 32 are closed, and transfer stage 22 is open, near the end of a Space half-cycle period, it is necessary to derive its pulses at a considerably higher repetition frequency than the 25 KHz of the clock train. A frequency of 1 MHz has been found to be satisfactory. It can be provided by a clock or clocks (not shown) operating at that frequency to supply the output trains from ADCs 27 and 33.

The error signal on reaching the Mark counter 41 over lead 34, these pulses are added to the number 64, just recently inserted in the Mark counter 41, to bring the total set in the counter to 80.

Thus 80 clock pulses at 25 KHz are now required to zeroise the counter 41, making the Mark half-cycle of the signal supplied to the actuator 7, 80 pulses long. As the overall length of the cycle, as defined by the Mark-plus-Space counter 44, remains at 128 clock pulses, the ensuing Space half-cycle supplied to the actuator 7 has the reduced length of 48 clock pulses.

In short, the Mark half-cycle has been expanded at the expense of the Space, the effect on the actuator 7 being to displace the centre of vibration of the piston 6A of the spool valve to the right as shown in FIG. 1, and causing the displaceable clutch plate to move towards its FE position.

The distortion is repeated in successive Mark-and-Space cycles, but eventually diminishes to zero as the error signal supplied on lead 34 is nulled. Then symmetry of the Mark-and-Space cycles is regained with the centre of vibration of the displaceable clutch plate in a new stabilised position.

Similarly where a change in the throttle setting is to cause the displaceable clutch plate to move towards its FD position, the error pulses supplied on the lead 34 are subtracted from the preset number 64 in the Mark counter 41. Fewer clock pulses at 25 $kH_2$ are therefore needed to empty the Mark counter, the Mark half-cycles are shorter than the Space half-cycles of the signals supplied to the actuator 7, operates by moving the displaceable clutch plate away from the co-operating fixed clutch part.

The operation of the follow-up servo system according to the present invention may be controlled in any conventional manner (not shown). Thus, the operation of each stage of the system may be under the control of output signals from a sequence counter. The sequence counter may be arranged to progress consecutively through its different stages in any convenient manner. Thus, it may progress under the action of clock pulses received from a master clock, the frequency of the clock pulses being such that it is ensured that each stage of the follow-up servo system has completed its task before the sequence counter transfers stages. Alternatively, the system may include electronic locking devices which are arranged so that the sequence counter does not transfer stages until each corresponding stage of the system has completed its task. The sequence counter may have 52 stages arranged to control the different stages of the system in the appropriate sequence.

Conveniently, the follow-up servo system for a vehicle clutch according to the present invention may be employed in combination with an automatic gear control for the vehicle, such as that described in my U.S. patent application Ser. No. 471,903, and now U.S. Pat. No. 3,922,910. In this gear control logic circuitry determines when the engine conditions are such that a selected gear may be engaged smoothly, and if the engine conditions are not suitable for the selected gear to be engaged smoothly, ensures that these conditions are altered in the appropriate manner. Thus, inter alia signals are provided when a gear has been selected, and when it has been engaged.

The follow-up servo system for the vehicle clutch in accordance with the present invention is only employed when the vehicle is started from rest and until first gear has been engaged, and both clutch parts are at the same speed.

The operation of the follow-up servo system is as follows:

With the ignition switched off the throttle opening is 0 percent, and the hydraulic system of the clutch actuator system is inoperable. Under the action of resilient biassing action of the diaphragm spring 1D of the clutch, the displaceable clutch plate is in its FE position, and the moving coil actuator 7 is in its extreme left hand position in relation to FIG. 1.

When the ignition is switched on initially the sequence counter causes the follow-up servo system to complete one cycle of operations, with the displaceable clutch plate in its FE position, and in particular to have placed in the store 21 the instantaneous JT position.

The displaceable clutch plate remains in its FE position until the gear control is moved from neutral to a selected gear, when a signal is provided by the automatic gear control. By this time the hydraulic system of the clutch actuator system is operable, and the selection of the gear causes the displaceable clutch plate to move to its FD position, with the moving coil actuator 7 in its extreme left hand position in relation to FIG. 1, and against the action of the resilient biassing means. This causes the control means 8 to control the clutch.

Subsequently, when the throttle control causes the throttle opening to be at least 15 percent, a TP signal is supplied to the counter 23, and the follow-up servo system causes the displaceable clutch plate to move at least to its instantaneous JT position.

The throttle control may move quickly to the 15 percent position or to the 100 percent position, or to any position therebetween. In any such event, the follow-up servo system causes the displaceable clutch plate to move smoothly to the position demanded by the throttle control demand member. If the throttle control initially is in a position below the 100 percent position (and above the 15 percent position), the vehicle comes into motion under a slipping clutch when the first gear is engaged. The displaceable clutch plate is not in its FE position until the throttle control is in its 100 percent position. However, if the initial setting of the throttle control is significantly greater than 15 percent it is unlikely that first gear can be engaged smoothly, and the automatic gear control referred to above will prevent the gear from being engaged.

Once first gear has been engaged, and the vehicle is moving, with both clutch parts at the same speed, the follow-up servo system becomes inoperable, and the automatic gear control determines the operation of the vehicle transmission system, until the road and/or engine speed are below a minimum value.

Where suitable logic circuitry is available for other purposes, such as for the vehicle's automatic gear control, for example, as described in my U.S. patent application Ser. No. 471,903, referred to above, the Mark/Space signal generator may more conveniently take the form shown in FIG. 4, where the components already described are given their previous references.

The Reset control of bistable 43 is derived from stages 41 and 42 much as before, except that the presetting of the number 64 in counter 41 is effected from the logic circuitry 51 associated with the vehicle's automatic gear control referred to above. This time the signal to Set stage 43 is also derived from the logic 51 (rather than from stage 45), and that signal also serves to open gates 26 and 32, and to close transfer stage 22. The detect-zero signal from stage 45 is applied to the logic 51 to start the sequence about to be described, and is also applied to close both those gates 26 and 32, and to close transfer stage 22. A signal from the logic 51 presets the number 126 in counter 44. The clock pulses for counting-down counters 41 and 44 are derived from a common source forming part of the logic circuitry 51. The actuator 7 is controlled by bistable 43 as before.

The operation will be described starting from the instant when counter 44 reaches zero, which occurs at a distance of two clock pulses from the end of a Space half-cycle. The resulting signal from the stage 45, in addition to closing gates 26 and 32, and opening transfer stage 22, causes logic 51 to initiate the following sequence of events:

a. Within the time defined by those two pulsed, the number is preset in counter 41 (plus or minus the error signal), and the number 126 is preset in counter 44.

b. At the end of those two pulses: (i) stage 43 is Set to start on Mark half-cycle; (ii) switches 26 and 32 are opened and transfer stage 22 is closed; and (iii) the clock pulses are applied to counters 41 and 44 to count down their contents.

When counter 41 reaches zero, stage 43 resets bistable 43 to switch over to a Space half-cycle.

When counter 44 reaches zero (at the 126th pulse and hence two pulses short of a complete Mark-and Space cycle), stage 45 closes switches 26 and 32, and opens transfer stage 22, and starts another sequence controlled by the logic 51 and as above described.

Where a very high degree of accuracy is not required, the circuit arrangements of FIG. 3 or FIG. 4 may be dispensed with and the circuit of FIG. 2 is modified as shown in FIG. 5 (where the components already described are given their same references), to produce an error signal of analog form.

The components 12 to 17 and 21 along the top row in FIG. 2 are as before.

The output from store 21, representing in digital form the JT position, is converted to analog form by a DAC stage 61 and applied as one of the two inputs to a unity gain buffer amplifier 62. To the other input is applied a feedback signal by way of a resistor 63 and the output from a constant-current generator 64. Resistor 63 is adjustable to represent in co-operation with the fixed current from generator 64 the value X— i.e., the JT/FE signal — also in analog form. The output from stage 62 thus represents the sum of the JT and JT/FE signals — i.e., the signal to represent in analog form the FE position in relation to the reference point.

This FE signal is applied to one end of a potentiometer 65, controllable by the throttle control over the range 0 percent to 100 percent as is potentiometer 24 in FIG. 1, which it replaces. To the other end of potentiometer 65 is applied the JT signal from DAC 61 by way of a unity gain buffer amplifier 66.

Thus the demand signal, corrected for wear of the mating surfaces, is obtained. This signal is composed of the JT signal at the 0 percent end of potentiometer 65 combined with the voltage drop across the intervening part of the potentiometer leading to the wiper 67. This arrangement differs from that of FIG. 2 in that whereas in the FIG. 2 circuit the JT signal is stored in digital form and combined in counter 23 with the digital signal from the demand transducer, in the FIG. 5 circuit the JT signal, being now in analog form, is supplied at the demand transducer itself.

The output from wiper 67 of potentiometer 65, representing the demand signal, is applied as one input to a comparator in the form of a unity gain difference amplifier 71. To the other input is applied a feedback signal by way of a resistor 72 together with the signal from wiper 12 of the measurement potentiometer 11 representing the actual position of the displaceable clutch plate in relation to the reference point.

The output from stage 71 together with a signal from a ramp (sawtooth) generator 73, operating at the frequency of 200 Hz, and required for the Mark-Space signal, are applied to the inputs of a different amplifier 74, from which the required M-S signal for the actuator is applied over a lead 75 to the actuator 7 (FIG. 1). The stages 71 to 74 comprise a conventional pulse-width modulator.

In operation, the signal from wiper 67 to the measurement potentiometer 65 represents the demand signal, corrected for wear, as already mentioned. As that signal and the signal from wiper 12 of the demand potentiometer, representing the actual position of the displaceable clutch plate in relation to the reference points are applied to the difference amplifier 71, its output represents the error signal in analog form.

A description of the action of the pulse-width modulator 71 to 74 will now be given with reference to the waveforms shown in FIG. 6.

In sawtooth output from the generator 73 is shown at FIG. 6(a), and this is applied at one input of the difference amplifier 74. The other input of the difference amplifier 74 comprises a bias voltage supplied from the difference amplifier 71, and representing the error between the measured position of the displaceable clutch plate and the position of the displaceable clutch plate demanded by the instantaneous throttle opening. Possible bias voltages are shown superimposed on the sawtooth waveform of FIG. 6(a), the bias voltages being indicated by chain dotted lines. The arrangement is such that, if the error is zero, the bias voltage, represented by the line 76, is at the mid-height of the sawtooth waveform. The output of the difference amplifier 74 is a Mark-Space signal with the Mark and Space half-cycles equal in length, as shown in FIG. 6(b). However, if the displaceable clutch plate is to be moved towards its FD position the error signal supplied to the difference amplifier 71 is positive, and the output of the difference amplifier 71, and supplied to the difference amplifier 74, is the bias voltage represented by the line 77 in FIG. 6(a), the line 77 being at a height greater than the mid height of the sawtooth waveform. The output of the difference amplifier 74 is a Mark-Space signal with the Mark half-cycles of smaller length than the Space half-cycles, as seen in FIG. 6(c). If the displaceable clutch plate is to be moved towards its FE position the error signal supplied to the difference amplifier 71 is negative, and the bias voltage supplied to the difference amplifier 74 is represented by the line 78 in FIG. 6(a). The line 78 is at a height less that the mid height of the sawtooth waveform, and the output of the difference amplifier 74 is a Mark-Space signal with the Mark half-cycles having a greater length than the Space half-cycles, as shown in FIG. 6(d). Under any condition the overall length of each Mark-Space cycle is the same, being determined by the frequency of the output of the sawtooth generator 73, which is constant. Under normally-encountered operating conditions the bias level supplied to the difference amplifier 74 varies smoothly, if it varies at all, and there is a smooth change in the relative lengths of the Mark and Space half-cycles in successive Mark-Space cycles.

It will be seen from a study of FIG. 5 that the demand to bring the displaceable part of the clutch to the JT position would occur when the throttle control is at its 0 percent point, rather than at 15 percent as in the arrangement previously described. To raise the starting point to the 15 percent level the circuit of FIG. 5 may be modified as shown in FIG. 7.

A second demand potentiometer 81 is connected in parallel with potentiometer 65 and a fixed tap 82 at the 15 percent level is applied as one input a signal from wiper 67 of potentiomer 65. The output from the amplifier is applied over a lead 84 to some overriding clutch-control apparatus with which the invention is not directly concerned. The rest of the circuit is as before.

Amplifier 83 includes internal bias arrangements such that whenever the potential of wiper 67 falls below that of the tap 82 — that is, whenever the throttle is less than 15 percent open — the amplifier develops a signal over lead 84 to force the displaceable clutch plate to disengage, overriding any existing control signal from the throttle control. This disengagement may be effected by forcing the output from amplifier 74 to be a Space signal not a Mark.

The embodiments above described may be widely varied within the scope of the invention. In particular there may be a reduction of a number of the components shown in the diagrams as separate stages by allocating the duties of several of them to a single on a time- sharing basis, thereby reducing both bulk and cost.

In a particular arrangement of that kind that has behaved well in practice, single A/D converter is used instead of the three shown separately in FIG. 2. Such a stage is also used as one of the four counters in the combination of the circuits of FIGS. 2 and 3 or FIGS. 2 and 4, the remaining three counters being combined into one.

What I claim is:

1. A follow-up servo system for controlling by means of an actuator system, and in response to signals from a demand member, the location of an axially displaceable part of a mechanical friction clutch with respect to the co-operating axially fixed part of the clutch, includes measurement transducer means for deriving a signal to represent the actual instantaneous axial location of the displaceable part in relation to a reference point, means for supplying a signal to represent the axial location of the displaceable part in relation to the reference point when the displaceable part is in its instantaneous just-touching (JT) position with the fixed part, by combining in the appropriate manner a signal from the measurement transducer means when the displaceable part is in its fully-engaged (FE) position with the fixed part, and a constant signal provided by means within the system and representing the distance between the JT and FE positions of the displaceable part, demand transducer means for deriving from the demand member an electrical signal representing the instantaneous setting of the demand member, this signal also representing the desired instantaneous axial separation between the displaceable and fixed clutch parts as demanded by the demand member, summation means responsive to and combining both the signal representing the JT position of the displaceable clutch part and the signal representing the desired instantaneous axial separation between the displaceable and fixed clutch parts, and so deriving the required instantaneous axial location of the displaceable part in relation to the reference point, comparator means for comparing the signals representing the required and the actual instantaneous axial location of the displaceable part in relation to the reference point and, in response to the detection of any difference therebetween other than a predetermined value, to provide an error signal indicative of the difference, and connections for applying the error signal to the actuator system to bring about a movement of the displaceable clutch part in the direction for nulling the signal error.

2. A system as claimed in claim 1 wherein the servo system is such that the signal from the measurement transducer, the just-touching signal, and the said electrical signal from the demand transducer are in digital form, a digital store is provided to hold each just-touching signal, the combining means from which the just-touching signal is obtained includes a digital counter, and means are provided for repetitively transferring the stored just-touching signal and the electrical signal from the demand member to a digital counter comprising the summation means and to produce a signal also in digital form to represent the required axial location of the displaceable clutch part, thereby causing the comparator means to produce the error signal in digital form.

3. A system as claimed in claim 1 wherein the servo system is such that the just-touching signal and the fully-engaged signal are derived in analog form, the demand transducer means includes a resistive potentiometer arranged to be traversed by a wiper under the control of the demand member, and the combining means from which the just-touching signal is obtained includes connections for applying those analog signals to the respective ends of the potentiometer of the demand transducer, thereby producing at the wiper the signal to represent the required axial locaton of the displaceable clutch part in analog form.

4. A system as claimed in claim 3 wherein to cause the clutch to disengage other than when the demand transducer wiper is at the end of the associated potentiometer at the potential of the just-touching signal, there is provided a second resistive potentiometer connected in parallel with the first-mentioned potentiometer, this second potentiometer having a tap at a predetermined potential at which clutch disengagement is required, and connections from the wiper and that tap to a difference amplifier are arranged to deliver a signal to cause clutch disengagement whenever the wiper is at a potential closer to that of the just-touching signal than is the predetermined potential of said tap.

5. A system as claimed in claim 1 wherein there is included means for deriving a Mark/Space electrical actuator control signal and applying it to the actuator system to produce a vibration of the displaceable clutch part towards and away from the co-operating fixed clutch part, and means for so applying the error signal as to vary the relative lengths of the Mark and Space parts of each cycle of the actuator control signal in dependence on the magnitude and sense of the error signal so as to tend to move the displaceable clutch part towards the required axial location demanded by the demand member, thereby tending to equalise those parts of each cycle as the required position is reached by the displaceable clutch part.

6. A system as claimed in claim 5 wherein the arrangement is such that the vibrations cease when the displaceable clutch part reaches the fully-engaged position.

7. A system as claimed in claim 5 where the error signal is in digital form, wherein the means for deriving a Mark/Space signal include a bistable stage arranged to supply a Mark or a Space signal depending on whether the stage was in the one or the other of its two stable states, a Mark counter arranged to receive a clock train of pulses, N of which clock pulses define a complete Mark/Space period, and a Mark-plus-Space counter also arranged to receive said train, the arrangement being such that the error signal, if present, is to be applied to the Mark counter, the Mark counter is to switch said bistable stage to one of its two stable states upon receipt of N/2 of those pulses in the absence of an error signal, and the Mark-plus-Space counter is to switch said bistable stage to the other of its two stable states upon receipt of a further N/2 of those pulses, and independently of whether an error signal is present or not, the error signal being applied to the Mark counter to hasten or delay its switching of said bistable stage in dependence on the sense of the error signal.

8. A system as claimed in claim 7 wherein the Mark-plus-Space counter is arranged to supply a signal shortly before the counter causes the bistable stage to be switched, the arrangement being such that this signal causes an error signal to be derived and applied to the Mark counter.

9. A system as claimed in claim 7 modified in that the switching of the bistable stage to said other of its two stable states is effected by an associated logic stage, arranged to be triggered into action by the Mark-plus-Space counter shortly before the counter has received the N clock pulses.

* * * * *